(12) United States Patent
Bhanjois et al.

(10) Patent No.: US 12,229,086 B2
(45) Date of Patent: Feb. 18, 2025

(54) OFFLOADING CLIENT-SIDE DEDUPLICATION OPERATIONS USING A DATA PROCESSING UNIT

(71) Applicant: Dell Products L.P., Round Rock, TX (US)

(72) Inventors: Bhimsen Bhanjois, Fremont, CA (US); Donna Barry Lewis, Holly Springs, NC (US); Chegu Vinod, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 18/160,148

(22) Filed: Jan. 26, 2023

(65) Prior Publication Data

US 2024/0256491 A1    Aug. 1, 2024

(51) Int. Cl.
*G06F 16/174*     (2019.01)
*G06F 11/14*      (2006.01)
*G06F 16/13*      (2019.01)

(52) U.S. Cl.
CPC ...... *G06F 16/1752* (2019.01); *G06F 11/1456* (2013.01); *G06F 16/137* (2019.01)

(58) Field of Classification Search
CPC . G06F 16/1752; G06F 16/137; G06F 11/1456
See application file for complete search history.

(56) References Cited

U.S. PATENT DOCUMENTS

| | | | |
|---|---|---|---|
| 2010/0312800 A1* | 12/2010 | Lumb | G06F 3/0641 707/812 |
| 2013/0318051 A1* | 11/2013 | Kumar | G06F 16/137 707/692 |
| 2022/0283998 A1* | 9/2022 | Rath | G06F 16/215 |

\* cited by examiner

*Primary Examiner* — Hosain T Alam
*Assistant Examiner* — Anthony G Gemignani
(74) *Attorney, Agent, or Firm* — Staniford Tomita LLP

(57) ABSTRACT

Embodiments for performing the inline deduplication by filtering streaming data as it is received by a backup client through a backup server executing a backup process. A data processing unit (DPU) is deployed to offload certain processing operations performed by a central processing unit (CPU) of the backup client. An inline deduplication operation comprises file operations, data segmentation, segment fingerprinting, compression, and encryption prior to storage in a backup target. The DPU is deployed and configured to perform the compression and encryption steps, the entire inline deduplication stack, or the entire inline deduplication stack plus the file system operations.

20 Claims, 12 Drawing Sheets

OFFLOADING CLIENT-SIDE DEDUPLICATION OPERATIONS USING A DATA PROCESSING UNIT

TECHNICAL FIELD

Embodiments relate generally to deduplication storage systems, and specifically to offloading client-based inline deduplication operations using a Data Processing Unit.

BACKGROUND OF THE INVENTION

Data is typically backed up by copying the data from a data source (backup client) to a storage device through a backup server. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. The Data Domain File System (DDFS) is an example of an inline data deduplication filesystem. As data gets written to the filesystem, DDFS breaks it into variable sized segments and a group of segments are packed in a compression region, and a fingerprint signature (hash value) is calculated for segments of compression regions and serves as a pointer reference to the original data.

The process of performing inline deduplication of backup data involves filtering the data as it is being ingested and storing only the data that is not already available on the data protection appliance. This can be accomplished by filtering the data on the data protection appliance itself as in server-side deduplication, or performing a portion of the filtering process on the backup client as in client-side deduplication. Client-side deduplication generally results in network and performance savings as only new data needs to be transmitted. However, this approach can significantly impact resources of the client system, and this impact can vary according to backup client platform and operating environment characteristics.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
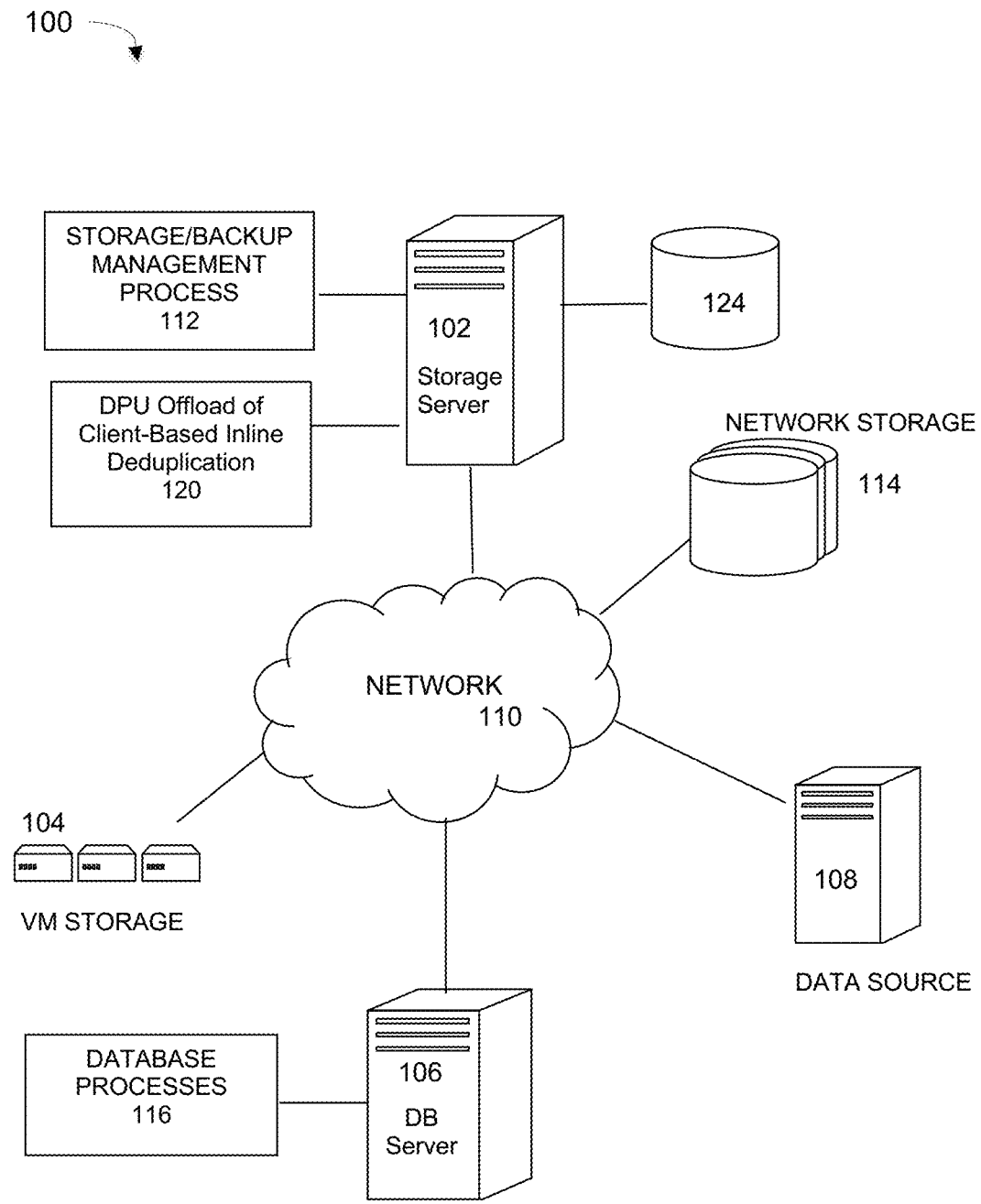
FIG. 1 illustrates a computer network system that implements one or more embodiments of a DPU offload of client-based inline deduplication.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method of optimizing the performance of client-side deduplication operations by offloading some of the client based CPU operations to a separate data processing unit (DPU). FIG. 1 illustrates a computer network system that implements one or more embodiments of a DPU offload of client-based inline deduplication.

In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The Data Domain File System (DDFS) from DellEMC is an example deduplication filesystem in which the filesystem anchors and segments data as it is ingested. The filesystem keeps track of segments which are stored on the disk, and if the segments are accessed again, the filesystem just stores a reference to the original data segment that was written to disk. A file is therefore a stream of segments, and these segments are uniquely identified by a key/label data element, called a fingerprint. Given a file offset and length, the corresponding data segment fingerprints need to be looked up to access the actual data.

The Data Domain File System (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments.

SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
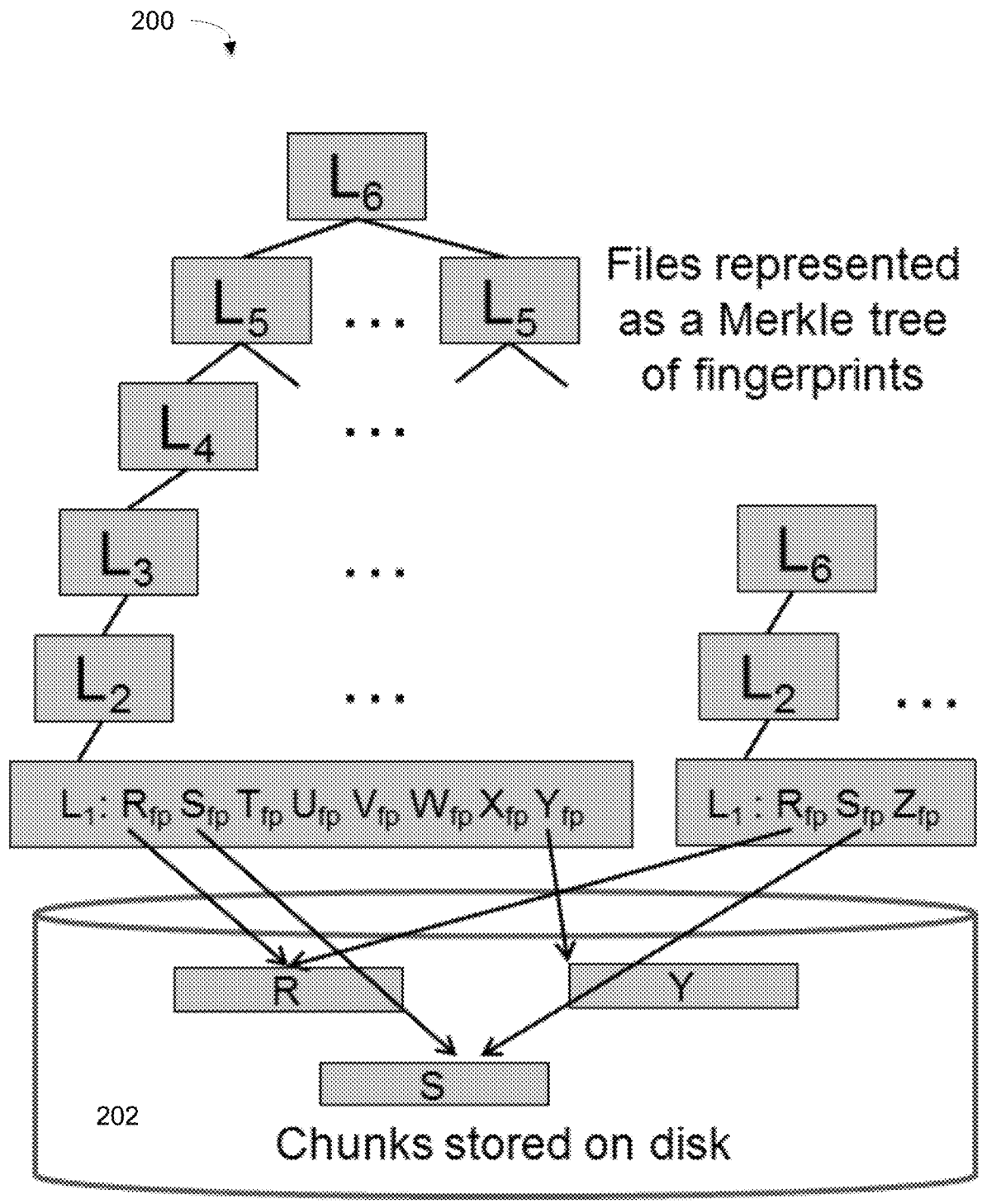
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$.

Figure 3:
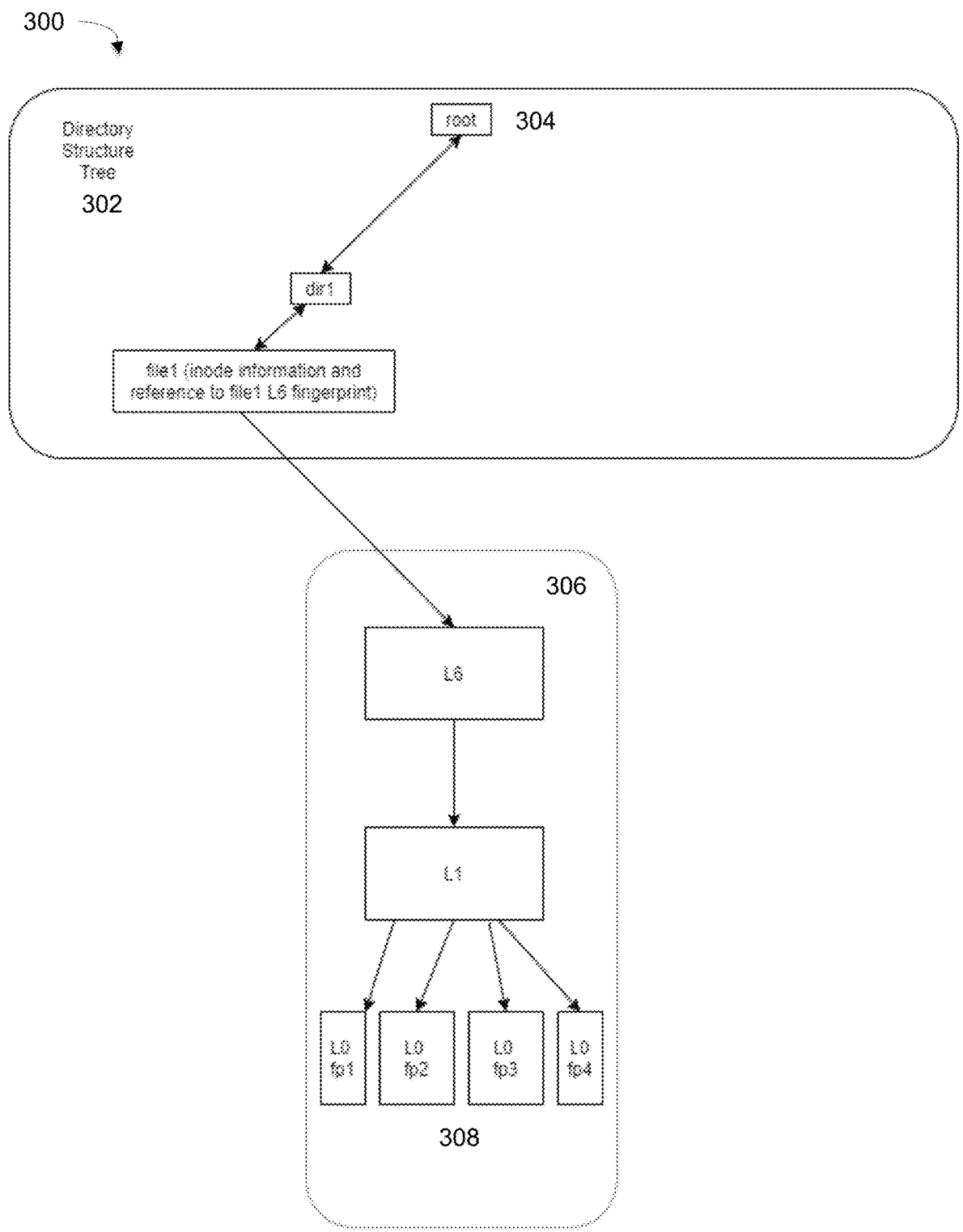
FIG. 3 illustrates a Data Domain filesystem Merkle tree accessed by a file under an example embodiment.

FIG. 3 illustrates a DDFS Merkle tree accessed by a file under an example embodiment. As shown in system 300, a directory structure tree 302 comprises a root directory 304, which accesses a directory (dir1) that holds a particular file (file1). The directory tree data for file1 comprises inode information and a reference to the file1 L6 fingerprint in the associated Merkle tree 306.

As mentioned above, the data chunks directly written to disk are referred to as $L_0$, meaning the lowest level of the tree, and which hold the respective fingerprints (fp1 to fpn). Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough to not need intermediate nodes. The $L_1$-$L_6$ chunks are referred to as $L_p$ chunks, where p is a parameter that ranges from 1 to 6 and indicates metadata representing the file. Deduplication takes place because a chunk can be referenced multiple times. The filesystem is a forest of Merkle trees, but these trees are not disjoint, particularly at the lowest level.

As mentioned above, the DDFS performs inline deduplication of backup data by filtering the data as it is being ingested and only storing data that is not already available on the data protection appliance. Such inline deduplication can be done as a server-side process by filtering the data on the data protection appliance itself, or as a client-side process by filtering on the backup client, which results in network and performance savings as only new data needs to be transmitted.

For the embodiment of FIG. 1, the deduplication functions of process 120 are performed by certain client-side processes by extending a Data Domain application programming interface (API) to utilize certain data processing unit (DPU) resources that are available in the system. A DPU may be provided as a processing circuit in or part of server 102 in addition to the server's CPU or other main processor, or it may be provided as a separate processing unit in or coupled to network 110.

In contrast to a general purpose CPU, a DPU is generally a data-centric, multi-core processor comprising tightly coupled accelerators for various multiplexed workloads. A DPU is generally designed to be an infrastructure endpoint that exposes resources to a data center and offloads key functionalities for data center scale computing (i.e., compute, storage, and networking). A DPU typically provides higher levels of compute, offload, memory, and OS capabilities than a SmartNIC, which provides a system with additional programmability to offload specific tasks from host systems.

Figure 4A:
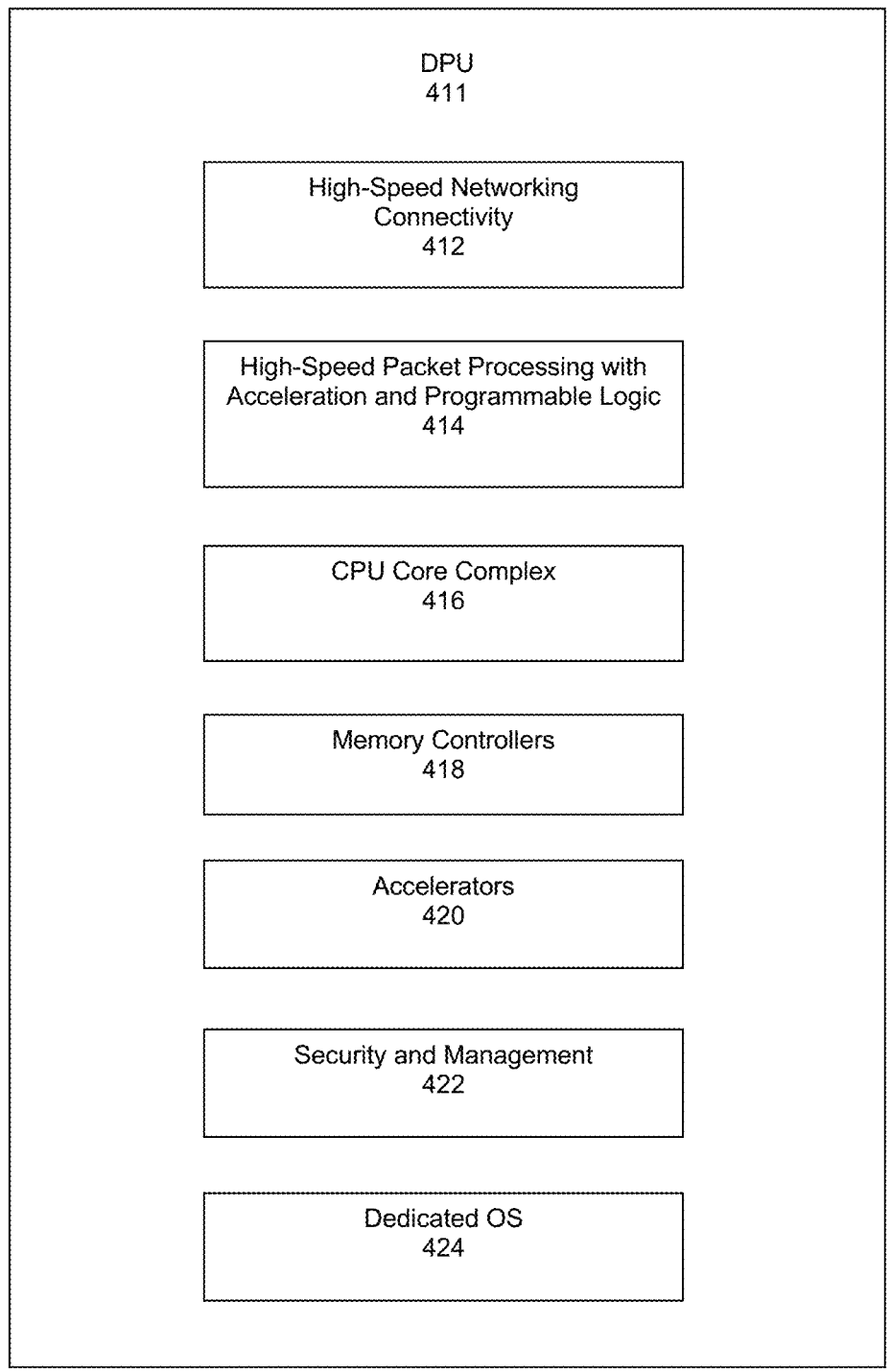
FIG. 4A is a block diagram of an example DPU for use in the system of FIG. 1, under some embodiments.

FIG. 4A is a block diagram of an example DPU for use in the system of FIG. 1, under some embodiments. As shown in FIG. 4A, DPU 411 comprises an interface for high speed networking connectivity 412, such as on the order of 25 Gbps to over 100 Gbps. It also includes high-speed packet processing 414, with specific acceleration and programmable logic (e.g., P4 or P4-like), and a CPU core complex 416, such as Arm or MIPS-based. Memory controllers 418, such as DDR4, or HBM and DDR5, are also provided. DPU 411 also includes one or more accelerators 420 for specific offload functions. Certain security and management features 422 can also be provided to offer a hardware root of trust, for example. The DPU also runs its own OS 424 that is separate from the host system, such as Linux or any other appropriate operating system. FIG. 4A is provided for purposes of example, and any DPU architecture may be used. Particular DPUs that can be used include Nvidia BF3, Intel Mount Evans, Marvel Octeon 10, Pensando, and Fungible, among others.

As stated above, deduplication functions of process 120 are implemented by extending a Data Domain application programming interface (API) to utilize the available DPU resources. In an embodiment, such an API extension is implemented on DDBoost APIs as provided by DellEMC, or any API for similar protocols. The Data Domain filesystem works with a propriety library, called Data Domain Bandwidth Optimized Open Storage Technology (OST), or "DDBoost." This library links with the application to reduce the bandwidth required by ingests. This method translates the application read and write requests to DDBoost APIs.

DDBoost is a system that distributes parts of the deduplication process to the backup server or application clients, enabling client-side deduplication for faster, more efficient backup and recovery. A data storage deployment may use any combination of interfaces simultaneously to store and access data. The clients, which may be referred to as DDBoost clients, may use the DDBoost backup protocol to conduct backups of client data to the appliance pool, restore the backups from the appliance pool to the clients, or perform other data protection operations. The DDBoost library exposes APIs to integrate with a Data Domain system using an optimized transport mechanism. These API interfaces are exported by the DDBoost Library to provide mechanisms to access or manipulate the functionality of a Data Domain file system. Embodiments may utilize the DDBoost File System Plug-In (BoostFS), which resides on the application system and presents a standard file system mount point to the application. With direct access to a BoostFS mount point, the application can leverage the storage and network efficiencies of the DDBoost protocol for backup and recovery. Some specific embodiments are described in conjunction with storage systems, products, and services referred to as Data Domain as provided by Dell EMC. It should be appreciated, however, that the described systems and techniques can be applied to other similar storage systems, products, and services. For example, some specific embodiments are described in conjunction with the DDBoost protocol. Aspects and principles of embodiments described, however, are applicable to other protocols such as NFS, CIFS, and others.

Figure 4B:
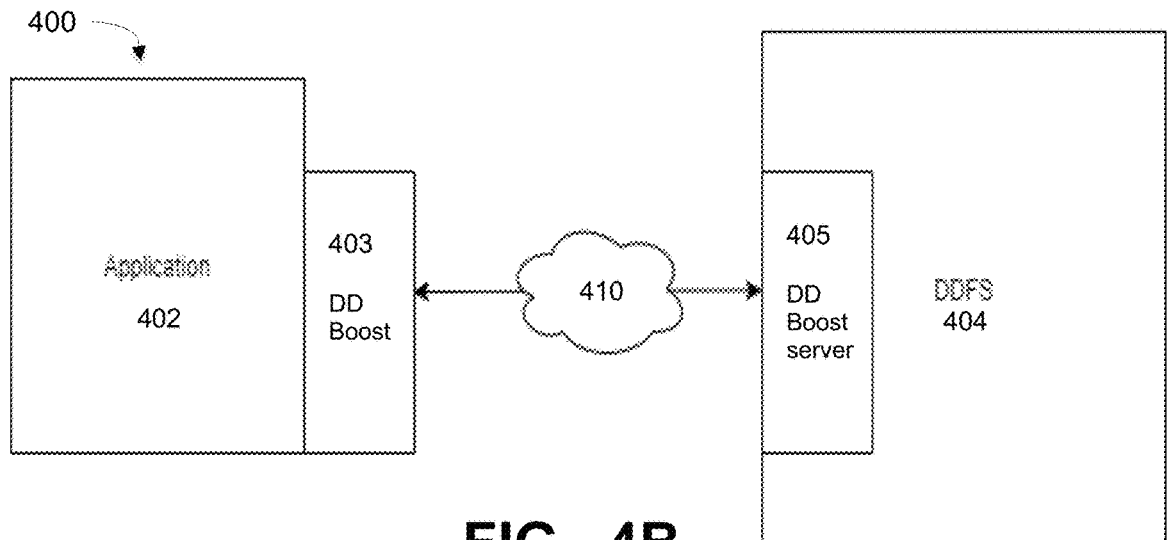
FIG. 4B illustrates the use of DDBoost APIs in conjunction with a Data Domain file system, under some embodiments.

FIG. 4B illustrates the use of DDBoost APIs in conjunction with a DDFS system 400, under some embodiments. As shown in FIG. 4B, for a backup application, client-side DDBoost library 403 interacts through the DDBoost API to the DDFS system 404 through a DDBoost server process 405. For an ingest, or restore process, the application 402 issues an open file, which is followed by a series of read or write requests, which are then followed by a file close.

Figure 5:
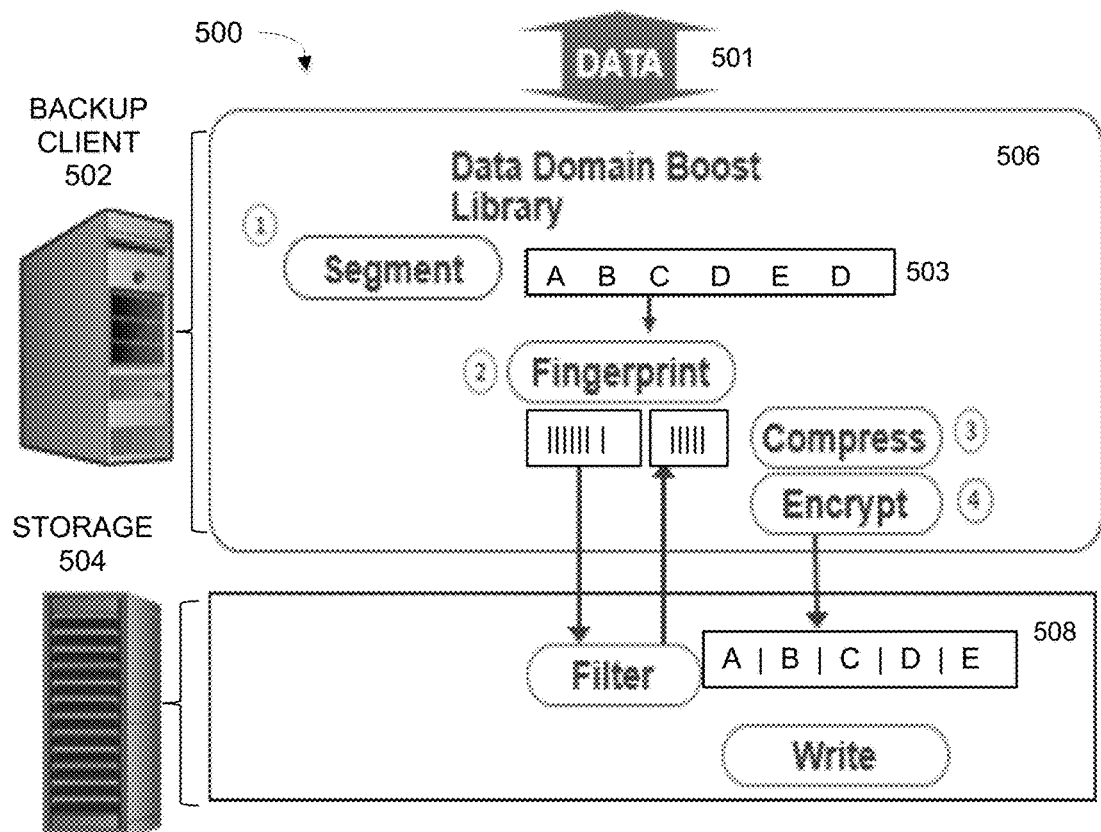
FIG. 5 illustrates a process of performing distributed or client-side inline deduplication using a DDBoost library, under some embodiments.

Following is a generic example of a DD Boost API, to open a file and specify the operation, in this case for reading.
    boost_open_file    (file_path,    FLAG=FOR_READING, &file_handle);
This would be followed by read requests:
    boost_read(file_handle, offset, length, &buffer);
The DDBoost library offers additional options for opening/reading, but the above simply provides a generic interface with parameters needed to support client-side deduplication. FIG. 5 illustrates a process of performing distributed or client-side inline deduplication using a DDBoost library, under some embodiments. As shown in FIG. 5, system 500 includes a backup client 502 that sources data to be backed up to network storage 504, such as a PowerProtect system. As data 501 is ingested by the backup process, the backup client 502 utilizes the DDBoost library 506 to perform the following processing stages: (1) calculate where to break the data 501 into segments 503 (e.g., rolling checksum); (2) perform a fingerprint (reference) calculation (e.g., SHA1 hash value); (3) compress the data segment; and (4) encrypt the data (when configured to do so).

The DD Boost library sends the hashed fingerprints for filtering to the Data Domain system, queries for the filtering results, and then compresses and sends data identified as new. These steps continue for the duration of the processing.

The advantages of the client-side deduplication process of FIG. 5 include: less data being sent over the wire to the data protection appliance as only filtered and compressed data will be transmitted, improved performance in bandwidth constrained environments by only sending to the backup appliance 502 what is needed, and freeing resources on the data protection storage 504 enabling the appliance to process a higher stream count. One consideration when implementing such a solution is the resource impact on the client system, as required by the fingerprinting (2), compression (3), and encryption (4) steps.

In an embodiment, a separate data processing unit (DPU) processor is used to offload some of the client-processes to provide more efficient inline deduplication processing for the client. In an embodiment, a DPU (also called a Smart-NIC) is a programmable system on a chip (SoC) device, with hardware acceleration and a CPU complex capable of processing data. DPUs can be provided in any appropriate form factor, such as PCIe form factor to be plugged into a server to support a range of processing offload functions. A DPU is designed to operate independently of the server CPU so that the CPU is are aware of the presence of the DPU but does not control it. An abstraction layer to the operational state of the architectural platform so that DPUs boot up using their own independent microcode or firmware or a lightweight hypervisor that treats its CPU subsystem like a virtual machine (VM) running in reduced-privilege mode. In this way, the DPU controls access to physical resources such as network interfaces, through which sensitive data can be accessed. Any payload executed on the CPU, including on the kernel itself, that must gain access to those resources must go through function-offload interfaces, presented in virtualized form to the operating system environment running on the CPU. This architecture bifurcation allows the DPU to assume direct execution of network and security functions and services.

In general, a DPU thus is a system on chip that combines three main elements: a programmable, multi-core CPU, a high-performance network interface and a set of flexible and programmable acceleration engines designed to improve data processing performance, and embodiments of system 100 use the DPU to offload at least some of the client-side deduplication processes 120.

Figure 6:
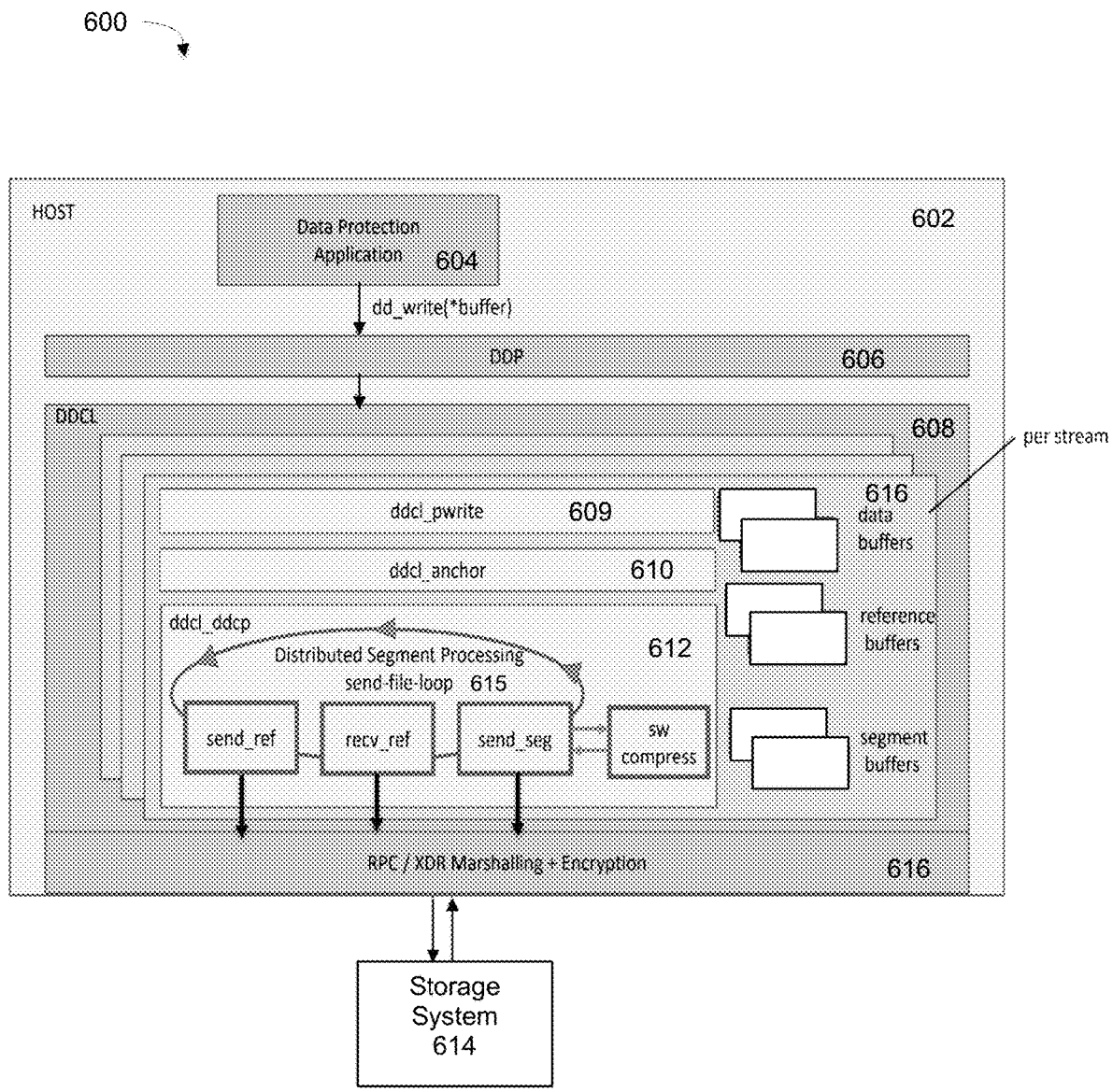
FIG. 6 illustrates an inline deduplication data path on a client, under some embodiments.

FIG. 6 illustrates an inline deduplication data path on a client, under some embodiments. As shown in FIG. 6, system 600 includes a host CPU 602. Data is sent to the DD Boost system from the application 604, such as by using a dd_write command. The upper layer of the DD Boost library is a Data Domain Protocol (DDP) Layer 606 that is used to manage client resources, and to translate backend processing into application consumable APIs. The data is copied into buffers within the Data Domain Client (DDCL) 608, where DDCL is the extension of the DDFS functionality on the client. For purposes of illustration, the DDCL 608 corresponds functionally to the backup 502 of FIG. 5 and includes a CPU that executes the client-side processing operations.

For write processing 609, the DDCL 608 divides the data into segments 612, either using fixed blocks or by using a rolling checksum to find data dependent anchor points 610. The DDCL 608 then calculates references (i.e., fingerprints) for each segment. The references are sent to the storage system (e.g., PowerProtect Data Domain) for filtering, and the results are polled from the storage system through the receive_reference ("recv ref") operation. The last step is then to compress and send the requested new segments to the storage system 614.

As shown in FIG. 6, buffers 616 including data buffers, reference buffers, and segment buffers are provided per stream. With respect to the operation of buffers 616, segment buffers are provided per stream, where a stream is associated with a single file being read or written. For multiple files there will be multiple streams and multiple instances of the data, reference, and segment buffers.

The send-file-loop 615 in element 612 represents the logic used to continually process a backup until completion. This logic cycles through the same steps to calculate references or fingerprints as data is received, send these to the deduplication server for filtering, query for results, and then compress, encrypt and send the data requested. The inline deduplication process of FIG. 6 generally improves overall system performance and saves significant network bandwidth. This, however, may come at some cost of CPU 602 to perform the required checksum, hashing, compression, and encryption operations.

Figure 7:
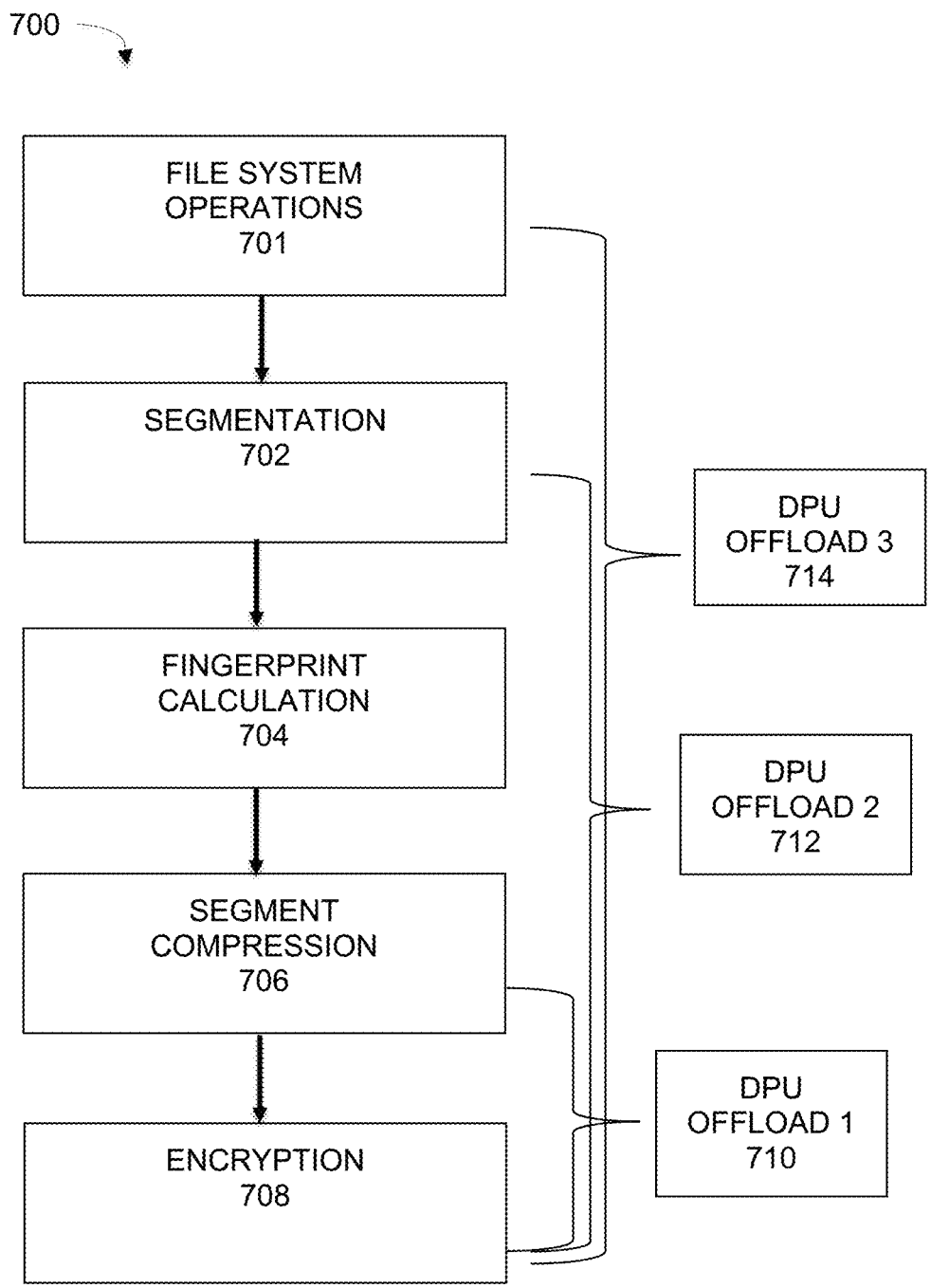
FIG. 7 is a diagram illustrating the main operations of the inline deduplication process as offloaded to a DPU, under different embodiments.

In an embodiment, a DPU is used to offload some of these functions from the CPU to reduce or minimize the resource consumption of the CPU. FIG. 7 is a diagram illustrating the main operations of the inline deduplication process as offloaded to a DPU, under different embodiments. As shown in diagram 700, the main operations comprise file system operations 701, segmentation of the data 702, calculation of the fingerprints 704, compression of the segments 706, and data encryption 708. All or some of these operations can offloaded from the client CPU to be performed by a DPU, as shown. For the example of FIG. 7, the compression 706 and encryption 708 operations are offloaded in a first DPU offload embodiment 710. The compression 706, encryption 708, fingerprint calculation 704, and segmentation 702 can all be offloaded in a second DPU offload embodiment 712. In a third DPU offload embodiment 714, all of the operations (FS operations, segmentation, FP calculation, compression, and encryption) can be offloaded to the DPU.

Figure 8:
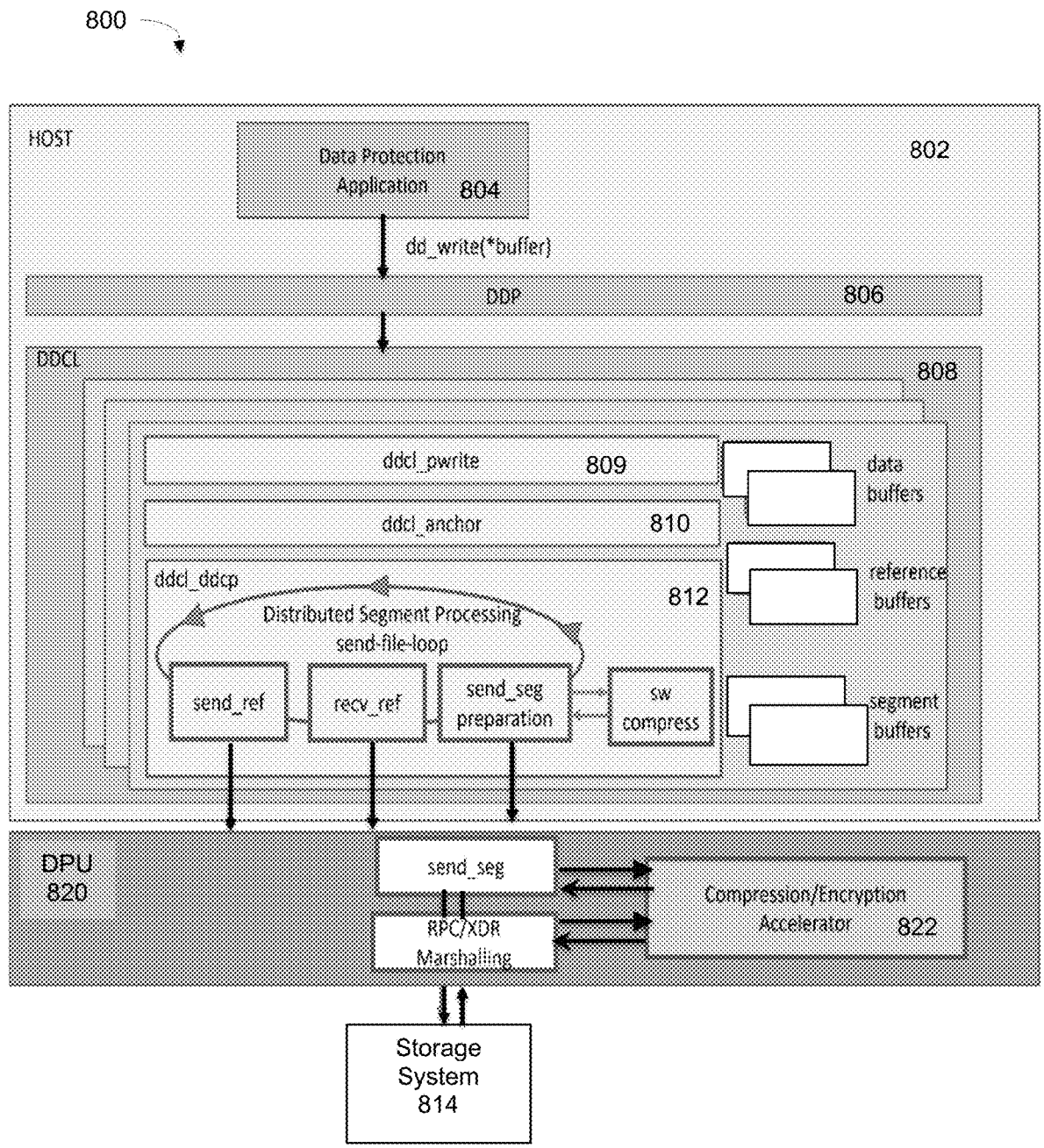
FIG. 8 illustrates a DPU inline deduplication segmentation compression and encryption offload process, under some embodiments.

As shown in FIG. 7, a first DPU offload embodiment 710 offloads the compression and encryption operations from the CPU. FIG. 8 illustrates a DPU inline deduplication segmentation compression and encryption offload process, under some embodiments. This essentially offloads the most CPU-intensive last stages of the inline deduplication processing to the DPU. System 800 illustrates using a DPU 816 to support asynchronous segment compression and encryption processing. The only portion of the inline deduplication process remaining on the client are the anchoring (steps to identify the segments) and calculation of the fingerprint references.

As shown in FIG. 8, system 800 includes a host CPU 802. Data is sent to the DD Boost system from the application 804, such as by using a dd_write command. The upper layer of the DD Boost library is a Data Domain Protocol (DDP) Layer 806 that is used to manage client resources, and to translate backend processing into application consumable APIs. The data is copied into buffers 816 within the DDCL.

Similarly to system 600 described above with reference to FIG. 6, for write processing 809, the DDCL 808 divides the data into segments 812, either using fixed blocks or by using a rolling checksum to find data dependent anchor points 810. The DDCL 812 then calculates references for each segment, which are sent to the storage system (e.g., PowerProtect Data Domain) 814 for filtering, and the results are polled from the storage system through the receive_reference ("recv ref") operation. These operation are performed in the DDCL CPU 608, while a DPU 820 is provided to perform the segment compression and encryption processing operations. For this embodiment, the DPU 820 includes a compression/encryption accelerator 822 that works with certain send segment and data marshalling functions to process and transfer data between the DDCL 808 and the storage system 814. In this embodiment, the most segment processing cycles are spent performing compression and encryption.

Although embodiments are described with respect to write operations for backup processes, it should be noted that similar benefits apply to restore processes as well. System 800 offloads the decryption processing to the DPU 820, and also offloads the restore decompression.

The CPU offload system of FIG. 8 enables inline deduplication processing on resource constrained environments. One example of this is the Storage Direct Solution where DD Boost resides on a PowerStore appliance. It enables faster inline deduplication processing using hardware accelerators, and enables faster encryption/decryption speeds using these dedicated resources.

Such a system also eliminates testing and maintaining platform specific code to support the segment processing. It is also scalable to future platforms and embodiments. For example, currently DD Boost systems supported on roughly 10+ platforms and deliver nearly the same number of platform specific DD Boost libraries. Using DPU 820 with segmentation compression/encryption eliminates the need for this platform specific logic.

As shown in FIG. 7, the second DPU offload embodiment 712 moves the complete inline deduplication stack to a DPU. This is optimum for scenarios where limited streams are required, e.g., client-direct backup environments or EDGE environments. As may be known, EDGE environments are systems where the data is processed on the device on which it is generated. Since the device is processing data only for itself, it requires support for fewer streams and therefore has fewer buffer and processor requirements. For this reason it is generally possible to offload even more of the processing to the DPU in these cases.

Figure 9:
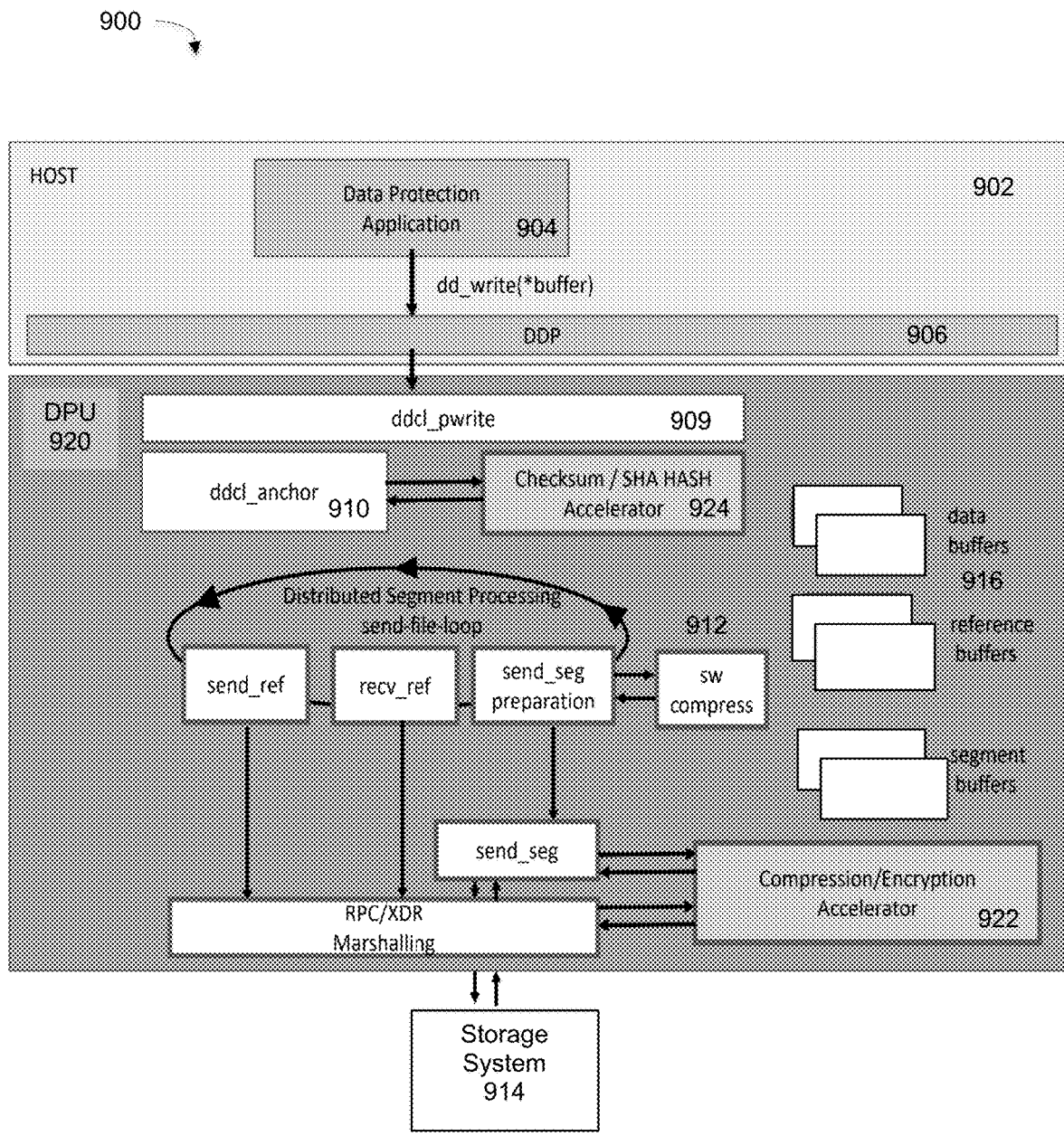
FIG. 9 illustrates a system for complete DPU inline deduplication stack processing, under some embodiments.

FIG. 9 illustrates a system for complete DPU inline deduplication stack processing, under some embodiments. In this embodiment, the inline deduplication processing is moved entirely to the DPU. This offloads the additional CPU intensive operations required for segmentation (aka anchoring) and fingerprinting. As shown in FIG. 9, system 900 includes a host CPU 902. Data is sent to the DD Boost system from the application 904, such as by using a dd_write (*buffer) command the DDP layer 906. The data is copied into buffers 916 within the DPU 920, as there is not DDCL for this embodiment.

Similarly to system 600 described above with reference to FIG. 6, for write processing 909, the DPU 920 divides the data into segments 912, either using fixed blocks or by using a rolling checksum to find data dependent anchor points 910. The DPU 920 then calculates references for each segment, which are sent to the storage system (e.g., PowerProtect Data Domain) 914 for filtering, and the results are polled from the storage system through the receive_reference ("recv ref") operation. The DPU 820 includes a compression/encryption accelerator 922 that works with certain send segment and data marshalling functions to process and transfer data between the DPU 920 and the storage system 914. For the embodiment of FIG. 9, the DPU 920 also includes a checksum accelerator 924 to calculate the anchor points 910. The additional anchoring and reference processing using checksums and SHA1 hash values, respectively, can be accelerated using this hardware assistance on the DPU.

The entire inline deduplication stack offload provided by system 100 enables processing on resource constrained environments. An example of this is the Storage Direct solution where the DD Boost library runs on a PowerStore appliance. This system enables faster inline deduplication processing using hardware accelerators, such as 922 and 924, and enables consistent inline deduplication processing performance using dedicated processors. As with system 800, this embodiment also eliminates testing and maintaining platform specific code to support the segment processing and speeds up support of future platforms, as delivering a DPU with full inline deduplication processing removes the platform specific pieces from the host software, and platform specific libraries will not be necessary in this case.

As shown in FIG. 7, the third DPU offload embodiment 714 moves the entire common filesystem backup to inline deduplication stack to the DPU. This embodiment uses BoostFS, which is a special DD Boost SDK use case. The DD Boost Software Developers Kit (SDK) was created to enable data protection application writers to interface to the DD Boost library and benefit from Distributed Segment Processing along with a set of additional optimization capabilities when backing up to a PowerProtect Data Domain appliance including virtual synthetic backups, fastcopy operations, and managed file replication. The BoostFS is provided as a supplemental DD Boost based product, providing the application with a filesystem interface to DD Boost capabilities. It enables users interested only in optimizing their streaming backup to do so without the DD Boost SDK integration.

Figure 10:
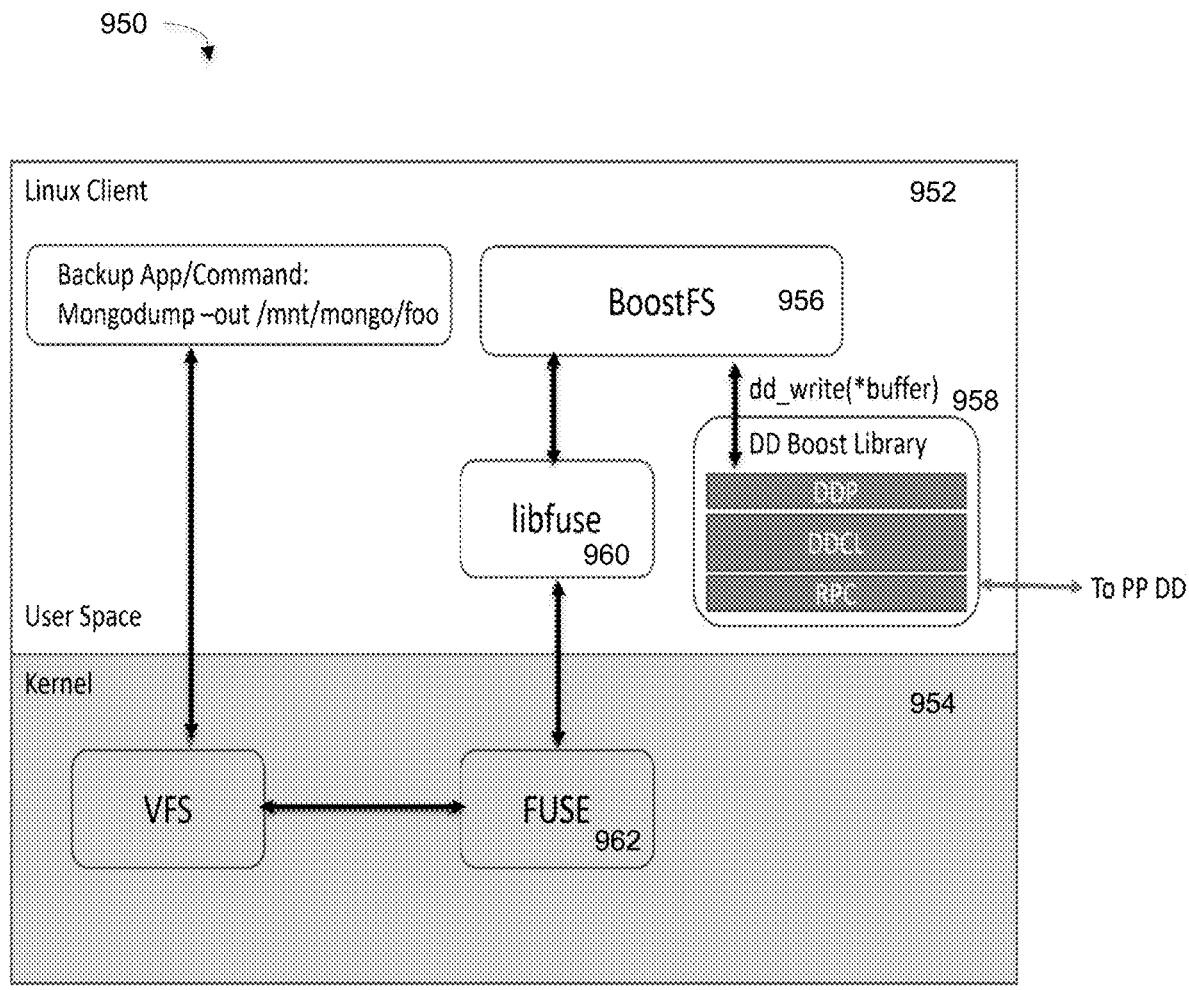
FIG. 10 illustrates a DD Boost filesystem interface for use with a DPU offload system, under some embodiments.

FIG. 10 illustrates a DD Boost filesystem interface for use with a DPU offload system, under some embodiments. As shown in FIG. 10, system 950 is a Linux client 952 that includes a user space portion 952 and kernel 954. The Linux client also includes a BoostFS component 956 that access the DD Boost library 958. Within kernel 954, a FUSE plugin 962 directs file system requests to an appropriate resource.

System 950 illustrates the BoostFS environment where the DD Boost APIs are accessed through a file system interface. BoostFS removes the need for a backup application to modify their code to use DD Boost APIs to benefit from DD Boost client-side deduplication. With BoostFS, the application can make standard file system calls to create backup files and these are routed through the DD Boost library 958.

System 950 further includes a Linux client system having user space 952 and kernel 954. BoostFS uses the 'File System in User Space' (FUSE) functionality available in Linux to direct filesystem requests to the DD Boost library 958. As shown in FIG. 10, element 962 is the FUSE kernel module, element 960 is the FUSE user-space library (libfuse), element 956 is BoostFS, and element 958 is the DD Boost library providing client-side deduplication.

Figure 11:
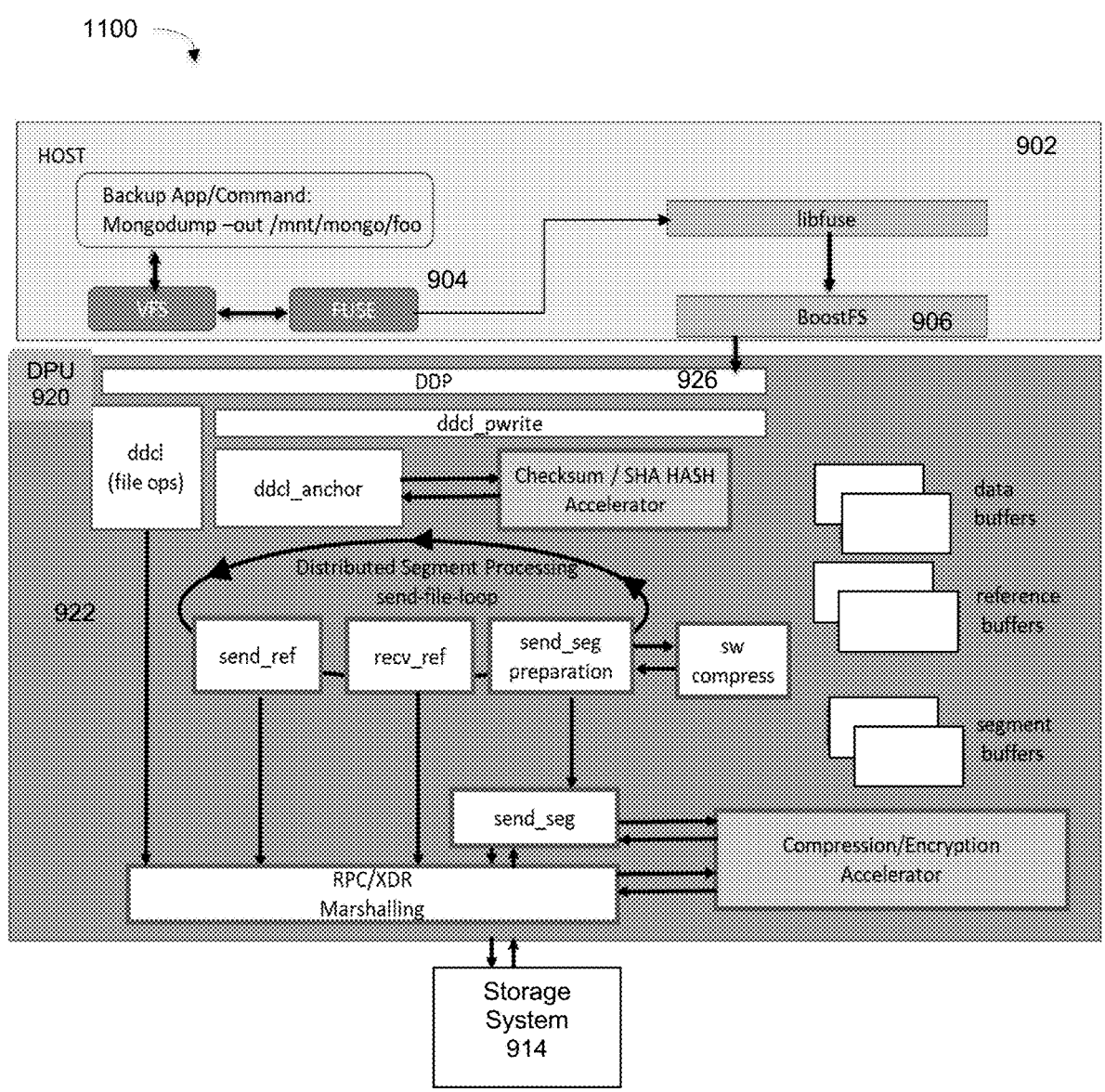
FIG. 11 illustrates a system for file system and inline deduplication stack processing, under some embodiments.

FIG. 11 illustrates a system for file system and inline deduplication stack processing, under some embodiments. The full inline deduplication stack resides on a DPU, and is made accessible to users using only filesystem operations to write files to the appliance. Like BoostFS, the FUSE plugin 962 can be used to direct filesystem requests to the DPU. As shown in FIG. 11, system 1100 includes a host CPU 902. As in system 900 of FIG. 9, the full inline deduplication stack resides on a DPU 920, however in the embodiment of system 1100, it is made available to users using only filesystem operations to write files to the appliance. The FUSE plugin 904 is used to direct filesystem requests to the DPU 920 through the BoostFS 906. In this system, since the complete DD Boost stack 922 is moved to the DPU 920, even generic file operations can be optimized. File operations are sent to the DDP layer 926 residing on the DPU 920 and any additional logic to compress, decompress, or encrypt is optimized. This embodiment enables filesystem backup operations to benefit from inline deduplication without additional impact to the system's CPU performance, and enables other generic file operations to benefit from the data processing optimization hardware available on the DPU.

Embodiments of the processes and techniques described above can be implemented on any appropriate backup system operating environment or filesystem, or network server system. Such embodiments may include other or alternative data structures or definitions as needed or appropriate.

Figure 12:
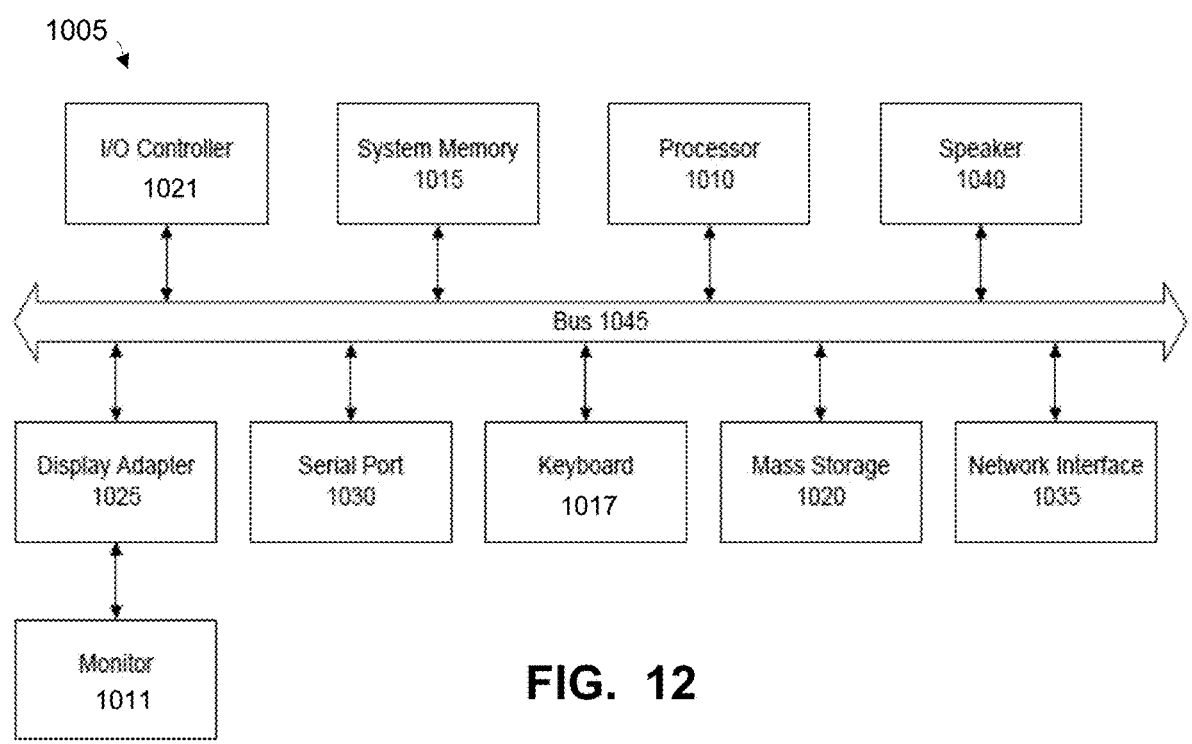
FIG. 12 is a block diagram of a computer system used to execute one or more software components of the methods and processing component described herein, under some embodiments.

The network of FIG. 1 maycomprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated "with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing client-side inline deduplication of backup data, comprising:
   performing the inline deduplication by filtering streaming data as it is received by a backup client through a backup server executing a backup process;
   performing, in a central processing unit (CPU) of the backup client, a segmentation process to determine where to break the streaming data into a plurality of segments;
   calculating, in the CPU, a reference for each segment of the plurality of segments;
   deploying a data processing unit (DPU) functionally coupled to the CPU to perform at least some of the processing performed by the CPU, wherein the DPU comprises a system on a chip (SoC) device operates independently of the CPU with independent microcode to operate as a virtual machine operating in reduced-privilege mode relative to the CPU;
   compressing, in the DPU, each segment;
   encrypting, in the DPU, each compressed segment; and
   backing up the streaming data by the inline deduplication of the backup process.

2. The method of claim 1 further comprising storing the encrypted and compressed segments in a storage device coupled to the CPU and DPU.

3. The method of claim 1 wherein the reference comprises a fingerprint of data calculated using a secure hash algorithm (SHA).

4. The method of claim 1 wherein the backup process is executed by a data storage server running a Data Domain File System (DDFS).

5. The method of claim 1 wherein the DPU comprises a hardware compression and encryption accelerator component, and the CPU comprises data buffers, reference buffers, segment buffers executing a distributed segment processing send file loop.

6. The method of claim 5 wherein the backup client utilizes a Data Domain (DD) Boost application program interface (API) to access a DD Boost library to perform the segmentation and the reference calculating steps.

7. A computer-implemented method of optimizing client-side inline deduplication of backup data, comprising:
   performing the inline deduplication by filtering streaming data as it is received by a backup client through a backup server executing a backup process;
   deploying a data processing unit (DPU) functionally coupled to the CPU to perform at least some of the processing performed by the CPU, wherein the DPU comprises a system on a chip (SoC) device operates independently of the CPU with independent microcode to operate as a virtual machine operating in reduced-privilege mode relative to the CPU;
   performing, in DPU, a segmentation process to determine where to break the streaming data into a plurality of segments;
   calculating, in the DPU, a reference for each segment of the plurality of segments;
   compressing, in the DPU, each segment;
   encrypting, in the DPU, each compressed segment;
   backing up the streaming data by the inline deduplication of the backup process.

8. The method of claim 7 further comprising storing the encrypted and compressed segments in a storage device coupled to the CPU and DPU.

9. The method of claim 7 wherein the reference comprises a fingerprint of data calculated using a secure hash algorithm (SHA).

10. The method of claim 9 wherein the DPU comprises data buffers, reference buffers, segment buffers executing a distributed segment processing send file loop and further comprises a hardware compression and encryption accelerator component, and a checksum SHA hash accelerator component.

11. The method of claim 7 wherein the backup process is executed by a data storage server running a Data Domain File System (DDFS).

12. The method of claim 11 wherein the CPU comprises a DD protocol layer managing client resources and translating backend processing into application consumable application program interfaces (APIs).

13. The method of claim 12 wherein the DPU utilizes a Data Domain (DD) Boost application program interface (API) to access a DD Boost library to perform the segmentation and the reference calculating steps.

14. A computer-implemented method of optimizing client-side inline deduplication of backup data, comprising:
   deploying a Data Domain (DD) Boost file system (FS) interface (API) to access a DD Boost library on a host computer hosting one or more applications generating the backup data;
   deploying a data processing unit (DPU) functionally coupled to the CPU to perform at least some of the processing performed by the CPU, wherein the DPU comprises a system on a chip (SoC) device operates independently of the CPU with independent microcode to operate as a virtual machine operating in reduced-privilege mode relative to the CPU;

performing, in the DPU, one or more filesystem operations accessing the backup data through the DD Boost API;

performing, in DPU, a segmentation process to determine where to break the streaming data into a plurality of segments;

calculating, in the DPU, a reference for each segment of the plurality of segments;

compressing, in the DPU, each segment;

encrypting, in the DPU, each compressed segment; and backing up the streaming data by an inline deduplication function of a backup process.

15. The method of claim 14 further comprising storing the encrypted and compressed segments in a storage device coupled to the host computer and DPU.

16. The method of claim 14 wherein the reference comprises a fingerprint of data calculated using a secure hash algorithm (SHA).

17. The method of claim 14 wherein the DPU comprises data buffers, reference buffers, segment buffers executing a distributed segment processing send file loop and further comprises a hardware compression and encryption accelerator component, and a checksum SHA hash accelerator component.

18. The method of claim 17 wherein the host further comprises a DD protocol layer managing client resources and translating backend processing into application consumable application program interfaces (APIs).

19. The method of claim 18 wherein the backup process is executed by a data storage server running a Data Domain File System (DDFS).

20. The method of claim 18 wherein the DPU further a Data Domain (DD) Boost application program interface (API) to access the DD Boost library and DD Boost FS to process the backup data of the application programs.

* * * * *